United States Patent
Bergmann et al.

[15] 3,658,145
[45] Apr. 25, 1972

[54] NOVEL SUSPENSION FOR TRACK-LAYING VEHICLES

[72] Inventors: Eugen O. Bergmann, 1848 Redondo Avenue, Salt Lake City, Utah 84108; Robert L. Cook, 1042 Springfield Drive, Walnut Creek, Calif. 94598

[22] Filed: Sept. 23, 1970

[21] Appl. No.: 74,626

[52] U.S. Cl. .................................180/5 R, 305/24, 305/27
[51] Int. Cl. ...............................B62m 27/02, B62d 55/16
[58] Field of Search.....................305/24, 27; 180/5 R, 9.24

[56] References Cited

UNITED STATES PATENTS

| | | | |
|---|---|---|---|
| 1,513,144 | 10/1924 | Wellman | 305/27 |
| 1,494,459 | 5/1924 | Clark | 305/27 |
| 1,861,866 | 6/1932 | Knox | 305/27 X |
| 2,367,751 | 1/1945 | Bombardier | 305/27 |
| 2,561,901 | 7/1951 | Bachman | 305/27 X |
| 3,183,016 | 5/1965 | Gustafsson | 305/27 X |
| 3,386,778 | 6/1968 | Rymes | 305/27 |
| 3,485,312 | 12/1969 | Swenson | 305/24 |
| 3,605,927 | 9/1971 | Wells | 180/5 R |

FOREIGN PATENTS OR APPLICATIONS

| | | | |
|---|---|---|---|
| 43,089 | 11/1933 | France | 305/27 |
| 908,944 | 11/1945 | France | 305/27 |

*Primary Examiner*—Richard J. Johnson
*Attorney*—William S. Britt, C. Harvey Gold and David V. Trask

[57] ABSTRACT

A novel suspension system for track-laying vehicles such as snowmobiles where there is a minimum clearance between the upper and lower portions of an endless track has now been invented. The invention, in a preferred embodiment, comprises an upper drive wheel and an upper idler each fixed by axle means to the frame of said vehicle and forward and rear support arms pivotally attached to the frame, the upper pivot points of said arms being spaced longitudinally. The lower extremities of said arms connect with track contact means adapted to maintain the track in contact with the terrain surface. The forward arm is pivotally connected to said forward track contact means and trails rearward to the upper pivot point of said forward arm while the rear arm projects forward from the rear track contact means to its upper pivot point. Horizontal spring means are preferably connected directly to the rear portion of the forward track contact means and to the forward portion of said rear track contact means. The horizontal spring means preferably interconnects the forward and rear track contact means. The novel suspension system of this invention is especially useful on snowmobiles having a rear mounted powerplant.

18 Claims, 5 Drawing Figures

INVENTORS
EUGEN O. BERGMANN
ROBERT L. COOK

BY
*William S. Britt*

ATTORNEY

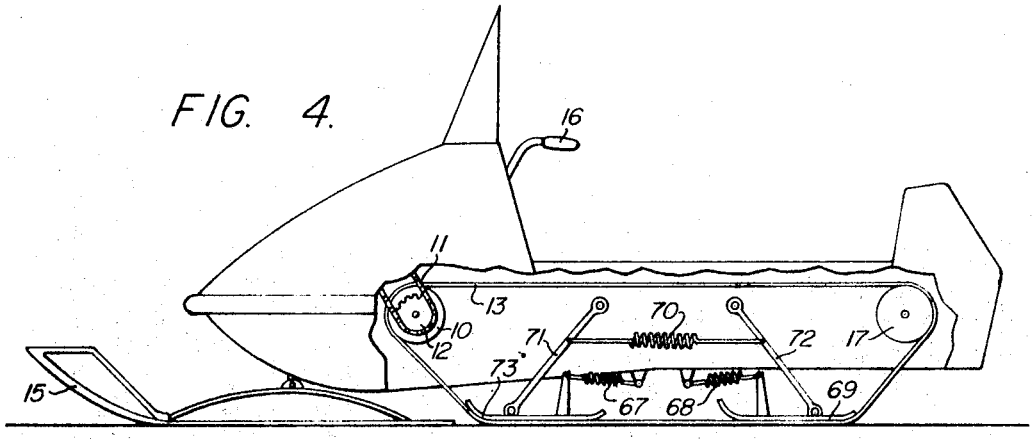

NOVEL SUSPENSION FOR TRACK-LAYING VEHICLES

BACKGROUND OF THE INVENTION

Numerous suspension systems exist for track-laying vehicles such as snowmobiles, tanks, personnel carriers, and the like. Suspension systems for tanks and other tank-type military vehicles must be rugged and generally extremely stiffly sprung. Suspensions for snowmobiles, however, by comparison are preferably lightly sprung to provide a comfortable ride for passengers and adapted to fit within the limited vertical space available between the upper and lower portions of the endless track.

Typical suspension systems for track-type military vehicles are illustrated in U.S. Pat. Nos. 2,561,901 and 2,458,549 wherein a pair of arms are connected at their upper extremities at substantially a common point and connected at the lower extremities to independent sets of bogie wheels. The purpose of such suspension systems is defined in U.S. Pat. No. 2,458,549 in column 3 as providing a common center of oscillation about which the whole vehicle suspension system may oscillate relative to the vehicle. The upper ends of the arms are splined to sleeves which are splined to torsion bars so that stiff spring means is provided for said suspension systems at the upper extremity of the support arms. Because of the nature of construction, such suspension systems require a substantial vertical space between the lower and upper portions of the endless track.

Typical suspension systems for snowmobiles are illustrated in U.S. Pat. Nos. 3,485,312, 3,023,824, 2,346,351, and 2,339,886. The first two patents describe suspension systems of recent development which have found acceptance in commercial vehicles. The system illustrated in U.S. Pat. No. 3,485,312 is an integral slide-rail system using a forward, rigid support arm which trails rearward from its upper extremity to its lower attachment to the slide-rail and a rear, telescoping support arm connected at its upper extremity to the frame of the vehicle and projecting forward to its lower extremity which is connected to the slide-rail. The system is effective in maintaining good contact between the lower portion of the tread and the terrain surface.

The system illustrated in U.S. Pat. No. 3,023,824 utilizes bogie wheels in paired sets each set rotating on a common axle and connected to the other set by spring means. This system provides a comfortable ride, however, it does not effectively maintain belt tension or uneven terrain surfaces. This bogie wheel suspension and the slide-rail system illustrated in these patents utilize a rear idler wheel which floats in relation to the rear of the vehicle frame. Neither of the systems is especially adaptable for use with snowmobiles having rear drive means.

OBJECTS OF THE INVENTION

It is an object of this invention to provide a suspension system which is at least as useful for rear drive vehicles as for forward drive vehicles. It is a further object of this invention to provide a suspension system having minimal unsprung weight.

Further objects of this invention are to provide a suspension system which maintains substantially constant track tension and continuous contact of the track with the terrain regardless of the type of terrain encountered for better traction, to provide a more comfortable ride for snowmobile passengers, and to provide a suspension system which can be adjusted in accordance with the passenger load and type of surface.

DESCRIPTION OF THE INVENTION

A suspension system for track-laying vehicles, especially snowmobiles and particularly rear-drive snowmobiles, has now been invented. The system in its preferred form comprises a drive wheel and an idler wheel both preferably fixed to the frame of the vehicle, although in front-drive vehicles the rear idler may float in a conventional fashion. For rear-drive vehicles the forward idler and rear drive-wheel are both fixed to the vehicle frame. The vehicle is supported and the track is maintained in contact with the terrain by forward track contact means and rear track contact means. Such track contact means may be a truck or trucks composed of several axles carrying bogie wheels or it may be a pair of slide rail assemblies. The track contact means are connected to the frames by a forward support arm extending from the forward track contact means rearward to its upper extremity where it is attached to an axle or shaft extending from the frame. The rear track contact means is connected by a rear pivot arm which extends forward from said track contact means to its upper extremity where it is attached to an axle or shaft connected to the frame. The track contact means are each connected to horizontal spring means and preferably interconnected by said spring means. The term horizontal spring means does not necessarily include only horizontal springs such as horizontal coil springs but includes springs which apply a tensional force to the track contact means in a substantially horizontal plane. Shock absorption devices may or may not be utilized with this suspension system.

Further description of the invention may be facilitated by reference to the attached figures.

FIG. 4 is a side view of a suspension system wherein separate spring means are attached to the forward and rear track contacting means; and FIG. 5 is a plan, sectional view of a rear-drive, dual-truck, bogie wheel system.

Figure 1:
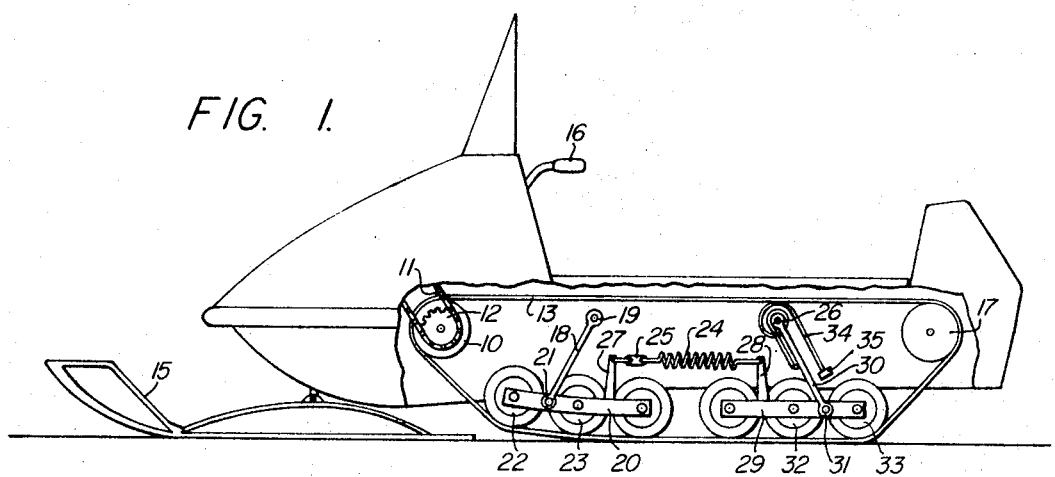
FIG. 1 is an elevational, partial sectional view of a side of a front-drive snowmobile.

In FIG. 1 a snowmobile is illustrated which has a forward placed power plant which drives a front drive-wheel 10 by a continuous chain 11 about a sprocket 12 connected to the drive-wheel 10 which drives an endless belt 13 which propels the vehicle. The front portion of the vehicle is supported by skiis 15 which may be turned by steering means 16 to guide the vehicle. In FIG. 1 the rear idler 17 is illustrated as being fixed to the frame, that is, the axle about which said idler (or idlers inasmuch as several idler wheels are usually attached to the same axle) is attached rigidly to the frame, that is, the idler axle does not move in a vertical or horizontal fashion with respect to the frame although it may rotate within a bearing attached to the frame.

The front track means comprises a truck composed of bogie wheels which, in FIG. 1, are attached to three separate axles with each axle carrying a plurality of wheels. The bogie wheel trucks of this invention usually contain at least two sets of wheels and preferably three sets of wheels as shown in FIG. 1 although four or more sets of wheels may be utilized, especially upon the rear truck. The forward truck is connected by an arm 18 (or a pair of laterally opposed arms) to the frame at the upper extremity of the arm by axle means 19. The arm 18 is connected to the truck frame longitudinal member 20 by axle means 21 preferably between the first set of bogie wheels 22 and the second most forward set of bogie wheels 23. In FIG. 1 the forward set of bogie wheels 22 on the forward truck are slightly elevated above the remainder of the bogie wheels to facilitate packing of soft snow and riding of the truck over obstructions, such as moguls, protruding rocks, and the like.

The forward truck is connected by spring means 24 which is illustrated as a horizontal coil spring, to the rear truck. The spring means 24 is connected through a tension adjusting means 25 which may be a conventional turnbuckle to a vertical projection 27 on the forward truck and a vertical projection 28 on the rear truck. The vertical projection 27 on the forward truck is preferably placed between the center and rearmost set of bogie wheels and is rigidly attached to the truck frame so that a tension force applied by spring means 24 tends to cause the forward truck to rotate about point 21 thereby providing a downward force on the center and rearmost sets of bogie wheels of the forward truck. In similar fashion, a substantially horizontal tensional force applied to the rear truck through vertical projection 28, which is preferably located between the most forward pair of bogie wheel axles on the rear truck will cause a downward force on said forward section of said rear truck. The interaction of the forward and rear trucks causes the endless track to stay in contact with irregular terrain and to maintain substantially constant tension in the endless track 13. The vertical projection 28 is preferably rigidly attached to the longitudinal frame member 29 of the rear truck.

The rear truck is connected to the vehicle frame by the rear support arm 30 which is pivotally attached to the truck frame 29 by axle means 31 located preferably between the rearmost pair of bogie wheels 32 and 33. The rear support arm is connected to the vehicle frame at its upper extremity by axle means 26. Additional forward force may be applied to arm 30 by a torsional, hairpin spring 34 to offset, at least to some extent, the rearward drag on the rear truck caused by the rearward movement of the endless belt in contact with bogie wheels of the rear truck or due to other shocks or loads causing arm 30 to move to the rear. The hairpin spring 34 may be omitted, although it generally performs a desirable function, especially with rear drive vehicles. One end of the hairpin spring 34 may be attached to the vehicle by bolt means or by means to vary the tension and which may also act as a stop for arm 30 when said arm moves in a rearward direction, thereby preventing interference of bogie wheel 33 and/or the bogie shaft with the rear idler 17.

Figure 2:
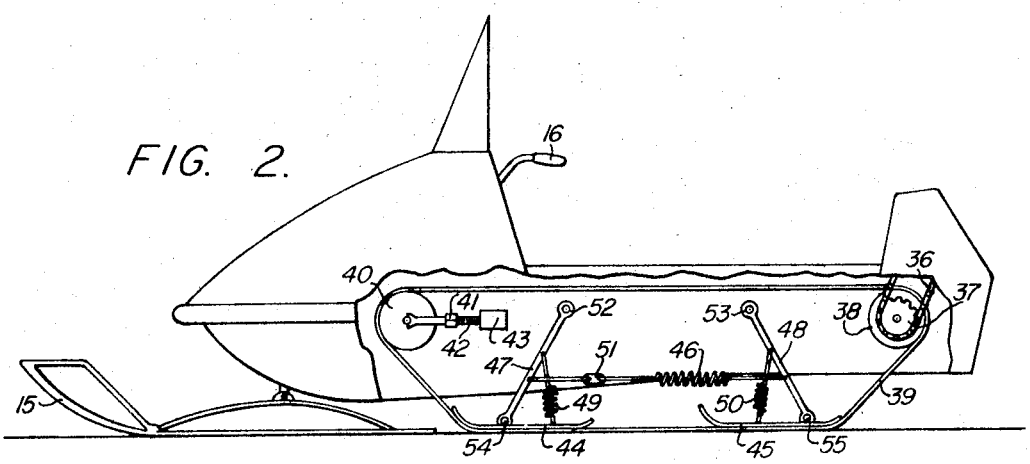
FIG. 2 is an elevational, partial sectional view of a side of a rear-drive snowmobile.

FIG. 2 is an elevational, partial sectional view of a snowmobile having a rear-drive which by means of a chain 36 drives a sprocket 37 attached rigidly to a rear drive-wheel 38. The rear drive-wheel 38 drives an endless track 39 over a forward, fixed, idler-wheel 40. The longitudinal position of the idler-wheel 40 may be adjusted by a tension adjusting means 41 to set the proper tension on the belt for the type of load or surface conditions or temperatures encountered. The track tension adjusting means illustrated comprises a bolt which makes contact with the axle of idler-wheel 40 and which is threaded from one end 42 into block 43 attached to the frame. Other equivalent adjusting means may also be utilized.

The suspension system illustrated in FIG. 2 comprises a forward arm 47 attached to a longitudinal member or slide rail 44. The slide-rail 44 is pivoted about connection 54 on forward arm 47. The forward arm 47 is pivoted on axle 52 at its upper extremity and is interconnected by horizontal spring 46 with a rear suspension arm 48. Tension adjustment means 51, for example, a conventional turnbuckle, is provided so that the tension of spring 46 can be adjusted to accommodate various loadings of the snowmobile.

The rear suspension arm 48 is connected by axle means 55 near the rear portion of the rear longitudinal member or slide-rail 45. Since the forward and rear suspension arms are directly interconnected by spring means a horizontal force created thereon by this spring does not result in any upward or downward forces on the slide-rail assemblies. Since it is desirable to have the rear portion of the forward slide rail assembly forced downward whenever tension develops in spring 46 a supplementary compression spring 49 is inserted substantially vertically between forward suspension arm 47 and the rear portion of forward slide-rail 44. The downward motion of the rear portion of the forward slide-rail 44 is desired to help maintain a track tension and to assist the track in maintaining contact with irregular terrain. In similar fashion a compression spring 50 is interposed between rear slide-rail 45 and rear support arm 48. The rear compression spring 50 is illustrated as being positioned at an acute angle to the ski assembly, however, the spring 50 may be positioned vertically or substantially at any angle so that a downward force is supplied to the forward portion of rear slide rail assembly 45 whenever tension develops in spring 46. Although the addition of compression springs 49 and 50 simulate the action provided by the suspension system illustrated in FIG. 1, it is generally preferred for most purposes to have the horizontal spring between the forward and rear track contact means connected directly to the track contact means.

In FIG. 2 the forward suspension arm 47 is shown to be longer than rear suspension arm 48 which is a preferred configuration for rear-drive snowmobiles or other vehicles. Since the power plant is located in the rear it is desirable to distribute some of the passenger weight forward onto the skiis 15 guiding the vehicle. By locating axle 52 connecting forward suspension arm 47 to the chassis substantially rearward, better distribution of weight is achieved.

The slide-rail assembly illustrated in FIG. 2 may comprise a single wide strip for each contact means or several ski-like strips may be utilized in each assembly. The forward suspension arm 47 is pivoted by axle means 54 to the forward slide-rail assembly at a point substantially forward of the longitudinal midpoint of the slide-rail. Also, the rear slide-rail assembly 45 is connected by axle means 55 to rear suspension arm 48 at a point substantially to the rear of the longitudinal midpoint of the slide-rail.

Figure 3:
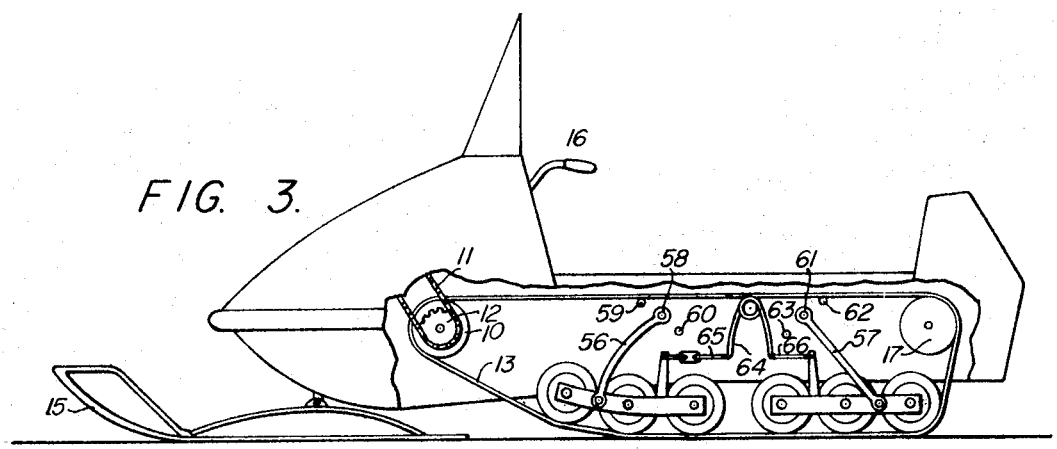
FIG. 3 is a side view of another embodiment of the suspension system of this invention.

In FIG. 3 a suspension system is illustrated wherein the forward suspension arm 56 and rear suspension arm 57 may be attached to the chassis or frame in various locations. This is especially desirable with reference to the forward arm 56 inasmuch as relocation of the upper pivot point permits the arm to assume a flatter angle for soft snow or a deeper angle for hard, packed or icy snow. The forward arm 56 is attached at its upper extremity by an axle 58 which may be a short axle for each side of the machine or the axle may transverse the entire width of the tracks so that the same axle carries a suspension arm on each side of the vehicle. Alternatively, the forward suspension arm may comprise a single arm located along the longitudinal, central axis of the vehicle with a single, full-width axle connecting said arm to the chassis or frame on each side of the track. A similar single suspension arm may be utilized for the rear track contact means.

The suspension system illustrated in FIG. 4 is one utilizing two separate springs 67 and 68 to place tension on the forward and rear track contact means, which are illustrated as slide-rails. One advantage of utilizing separate springs is that the forward and rear track contact means may be each placed under different levels of tension. The pulling of the track about the rear track contact means, e.g., slide-rail 69, tends to place a rearward force on said rear contact means due to the slight friction between the belt and the slide-rail or bogie wheels. This rearward force especially encountered with rear drive vehicles, should generally be counteracted by additional tension in spring means 68. For this reason it is desirable to have slightly greater tension in spring 68 than in spring 67. The use of separate springs has a disadvantage inasmuch as there is no interaction between the forward and rear contact means. However, an additional spring 70 may be optionally placed between the forward arm 71 and the rear arm 72 to provide some interaction between the forward and rear track contact means 69 and 73. It is preferred to have spring 70, similar to spring 46 of FIG. 2, attached as low as possible on arm 71 and 72 so that a less rigid spring may be utilized.

FIG. 5 is a plan view of a suspension system of the type illustrated in FIG. 1 with the exception that FIG. 5 is for a rear-drive vehicle. The vehicle illustrated in FIG. 5 has been sectioned in order to provide an overhead view of the relationship among the various components of the suspension. The rear drive-wheels 74, 75, and 76 are attached rigidly to an axle 78 which is journaled into bearings attached to the side members 79 and 80 of the chassis. The drive wheels 74, 75, and 76 are rotated by axle 78 which is rigidly attached to drive sprocket 77 which is connected by a chain to the output drive of the engine. The belt or track 81 is also sectioned in order to expose the components which would otherwise be hidden from view.

The track 81 is pulled over the drive wheel 74, 75, and 76. It travels forward and rides over idler wheels 82, 83, and 84 which preferably rotate on axle 85. The number of drive wheels and idler wheels is illustrated in FIG. 5 as three of each, however, more or less wheels may be utilized although a minimum of two drive-wheels and two idler-wheels are preferred. A single, drum-shaped wheel substantially the width of the track may be utilized, however, for weight purposes it is preferred to use three or four wheels as illustrated in FIG. 5.

The front axle 85 may be adjusted along the longitudinal axis of the vehicle to provide various tensions on the track 81. The adjustment of axle 85 is accomplished by adjusting means comparable to means 41 illustrated and described in FIG. 2.

In FIG. 5 the track 81 is held in contact with the terrain by a total of 22 bogie wheels, the forward and rear trucks each possessing eleven bogie wheels. More or less bogie wheels may be utilized depending upon weight limitations and on the character of terrain contact desired. The bogie wheels of the forward truck are attached by axles 86, 87, and 88 to truck frame members 89 and 90. The bogie wheels may rotate on their respective axles or, alternatively, the bogie wheels may be fixed to the axles and while the axles rotate in bearing means fixed to truck frame members 89 and 90. The forward truck is suspended by suspension arms 91 and 92 through axle 93 which passes through truck frame members 89 and 90. Axle 93 may rotate in suspension arms 91 or 92 or it may be fixedly attached thereto and rotate in truck frame members 89 and 90. Also, two short studs may be attached respectively to suspension arms 91 and 92 for use instead of the single axle 93. Also, a single suspension arm may be utilized by attachment near the center of axle 93 and attached at its upper extremity to axle 94. Axle 94 is fixed to vehicle frame members 79 and 80 to support suspension arms 91 and 92 at their upper extremities. Axle 94 may rotate in bearing means attached to member 79 and 80 or, alternately, suspension arms 91 and 92 may rotate on axle 94. Suspension arms 91 and 92 are illustrated as being slightly longer than rear suspension arms 95 and 96 inasmuch as this is the preferred arrangement for a rear-drive vehicle.

Rear suspension arms 95 and 96 support the rear truck in much the same manner as suspension arms 91 and 92 support the front truck. Rear suspension arms 95 and 96 are connected to an axle 97 which passes through rear truck frame members 98 and 99 which also have attached thereto axles 100, 101, and 102 which support the bogie wheels of the rear truck. The rear suspension arms 95 and 96 are attached to a single axle 103 which supports said arms at their upper extremities through attachment to side frame members of the vehicle 79 and 80. The front truck and rear truck are interconnected by springs 104 and 105 which are connected to the truck frame members by projections 106, 107, 108, and 109. The springs 104 and 105 could be attached directly to the forward truck frame members 89 and 90 directly to the corresponding rear truck frame members 95 and 96, however, by having the springs 104 and 105 attached to projections 106, 107, 108 and 109 the tension of the springs tends to place a downward force on the rear portion of the forward truck and upon the forward portion of the rear truck having to maintain the proper contact pressure along track 81. A single spring located along the central longitudinal axis of said vehicle can be substituted for springs 104 and 105, however, a pair of outboard springs is preferred for ease of tension adjustment, replacement and the like.

In the above described figures the upper pivot point of the forward suspension arms and upper pivot points of the rear suspension arms are generally separated by about 10 percent to about 40 percent of the distance between the track idler wheel and the track drive wheel and are preferably separated by about 15 percent to about 30 percent of the distance between said idler and said drive wheel. It is preferred to have a substantial longitudinal distance in relation to the vehicle length separating the upper pivot point for the front suspension arm and the upper pivot point of the rear suspension so that any shifting of weight of passengers or changes in location of load will not cause a substantial change in the loading upon the skiis at the forward end of the vehicle or upon the track driving the vehicle. Furthermore, a preferred location for the forward arm is one which distributes vehicle weight upon the guide skiis in approximate relation to ski area, as compared to total ski and track contact area. Also, it is preferred for rear drive vehicles that the forward suspension arms be longer than the rear suspension arms. It is understood, of course, that the exact location configuration of the suspension system will vary depending upon the type of vehicle desired, the usual load to be carried and the type of use, e.g., racing, and similar considerations.

When bogie wheels are utilized on a pair of trucks in this invention it is preferred that the suspension arms be attached to the forward truck forward of the midpoint of the truck, for example, if three axles are used on the truck it is preferred that the forward suspension arm be attached between the most forward pair of axles while the rear suspension arm is attached behind the midpoint of the truck, for example, if three axles are used on the rear truck it is preferred that the rear suspension arm be attached between the center axle and the rear most axle.

The suspension system of this invention is especially advantageous for snowmobile type vehicles inasmuch as the unsprung weight is especially low thereby reducing the momentum of vibrations and oscillations. Also, the suspension system is simple in design and function and eliminates the need for spring-loading of the idler wheel in order to maintain track tension, as is required in many conventional snowmobile suspensions. Also, by interconnecting by spring means the forward track contact means with the rear contact means an interaction between the two is created thereby aiding in maintaining contact with irregular shaped terrain. Also, through use of only one suspension arm or one pair of suspension arms for each truck, the arms may be made considerably longer thereby providing a longer path of movement than can be obtained by suspension wherein each axle of bogie wheels is connected by sizzor arms and sizzor springs to the next adjacent axle of bogie wheels. The longer suspension arms permit greater upward and downward movement of the vehicle in relation to the terrain thereby providing a less rigid ride. Also, by using a horizontal spring to connect the forward and rear track contact means a less stiff spring may be utilized than if the spring were connected near the top of the suspension arms. Also, the connection of the horizontal spring to projections extending above the forward and rear track contact means aids in maintaining track contact pressure.

Although the instant invention has been described with reference hereinabove to specific embodiments it is not intended that the invention be limited solely thereto, but to include all the variations and modifications falling within the scope of the appended claims.

We claim:
1. A suspension system for a track-laying vehicle having minimal clearance between the upper and lower portions of the endless track wherein said track is located at the rear of said vehicle and supports less than the full weight of said vehicle, comprising
   a. an upper drive-wheel fixed to said vehicle and connected to power means for driving said track,
   b. an upper idler-wheel fixed to said vehicle and supporting said track,
   c. support arms pivotally attached to the frame of said vehicle comprising at least one forward arm and at least one rear arm, the upper pivot points being spaced longitudinally,
   d. a forward rigid longitudinal member provided with track contact means adapted to maintain the lower, forward portion of said track in contact with the terrain surface, and pivotally connected to said forward arm which trails rearward to the upper pivot point of said forward arm,
   e. a rear rigid longitudinal member provided with track contact means adapted to maintain the rear portion of said track in contact with the terrain surface, and pivotally connected to said rear arm which projects forward to the upper pivot point of said rear arm, f. forward horizontal tension spring means operatively connected to said forward longitudinal member and adapted to force said forward track contact means rearward under no-load conditions, g. rear horizontal tension spring means operatively connected to said rear longitudinal member and adapted to force said rear track contact means forward under no-load conditions, and h. said horizontal spring means located to impose its force upon said forward and rear longitudinal members at positions below said upper pivot connections of said forward and rear arms.

2. The suspension system of claim 1 wherein the spring means interconnects the forward and rear longitudinal members.

3. The suspension system of claim 1 wherein the horizontal spring means is fitted with adjustable tensioning means.

4. The suspension system of claim 1 wherein the spring means is connected to said forward longitudinal members to the rear of the pivot connection to said forward arm and connected to said rear longitudinal members forward of the pivot connection to said rear arm.

5. The suspension system of claim 1 wherein the rear arm is fitted with spring means adapted to force said arm forward under no-load conditions.

6. The suspension system of claim 1 wherein the upper pivot point of the forward arm is adjustable to provide different included angles between said arm and the terrain.

7. The suspension system of claim 1 wherein the upper pivot points of said arms are located in substantially the same horizontal plane.

8. The suspension system of claim 1 wherein the track laying vehicle is a snowmobile supported in the front by ski means and having a box shaped opening in the rear thereof for accommodating an endless track drive means and suspension system.

9. The suspension system of claim 8 wherein the snowmobile has rear power means and said upper drive wheel is journaled to bearing means rigidly fixed to the rear frame of said snowmobile.

10. The suspension system of claim 9 wherein the snowmobile has a forward idler wheel journaled to bearing means rigidly fixed to the forward frame of said snowmobile.

11. The suspension system of claim 9 wherein the forward arm is longer than said rear arm and has a smaller included angle between said forward arm and the terrain surface than exists between said rear arm and the terrain surface.

12. The suspension system of claim 9 wherein the upper pivot point of the forward arm is located longitudinally so that the guide skiis bear substantially the same weight per unit area as the track.

13. The suspension system of claim 1 wherein said spring means interconnects said longitudinal members by connection to the lower portion of said forward arm and said rear arm.

14. The suspension system of claim 13 wherein the forward longitudinal members is fitted with compression spring means adapted to force the rear portion of said forward longitudinal members downward under no-load conditions.

15. The suspension system of claim 1 wherein the longitudinal members comprises forward and rear slide-rail assemblies.

16. The suspension system of claim 15 wherein the forward arm is connected to said forward slide-rail assembly at a point forward of its longitudinal midpoint and said rear arm is connected to said rear slide-rail assembly at a point behind its longitudinal midpoint.

17. The suspension system of claim 1 wherein the track contact means comprises forward and rear trucks formed by a pair of laterally spaced longitudinal each having at least two axles interconnecting said longitudinal members and supporting bogie wheels.

18. The suspension system of claim 17 wherein each truck has three axles and said forward arm connects to said forward truck at a point between the most forward pair of axles and said rear arm connects to said rear truck at a point between the most rearward pair of axles.

* * * * *